UNITED STATES PATENT OFFICE.

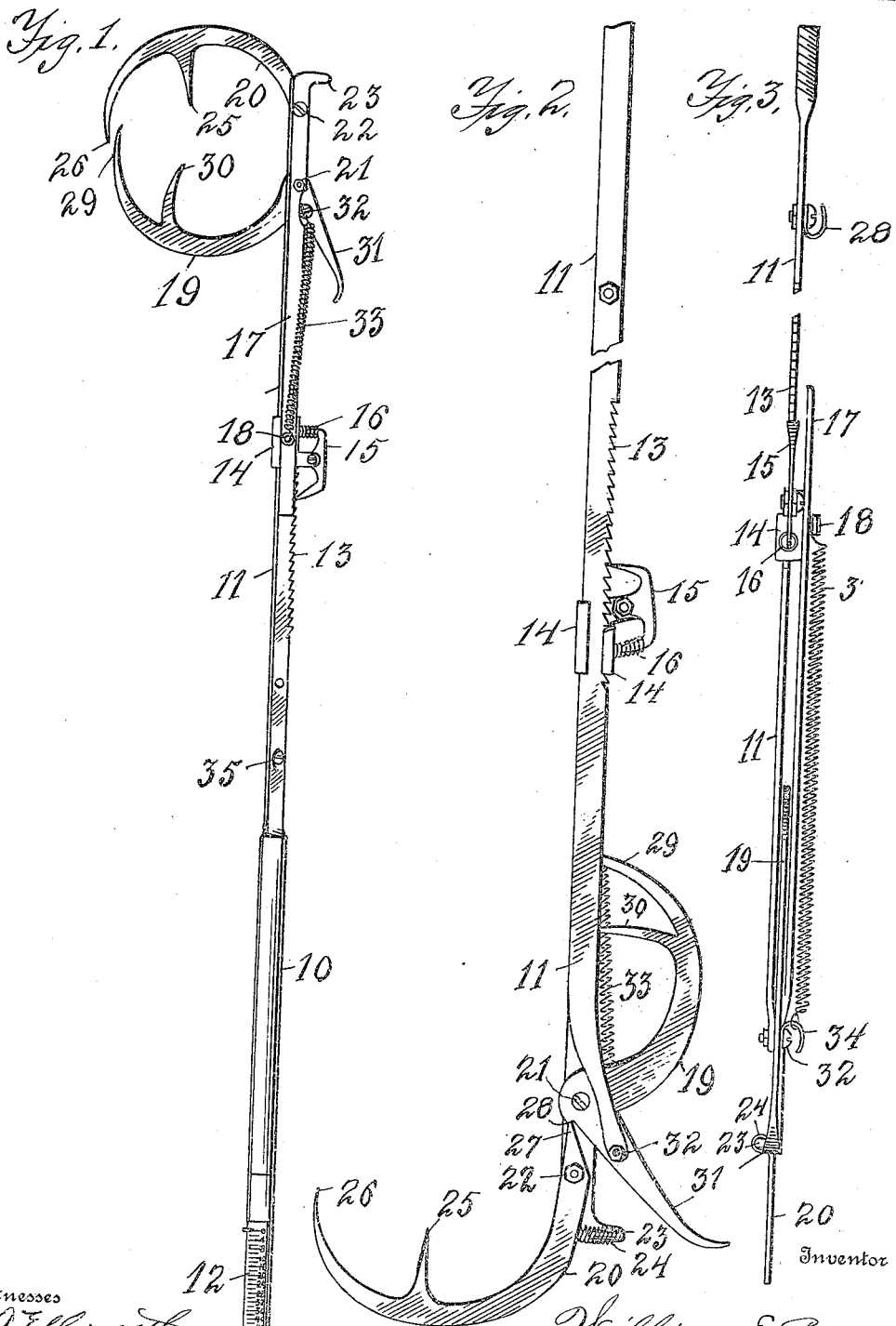

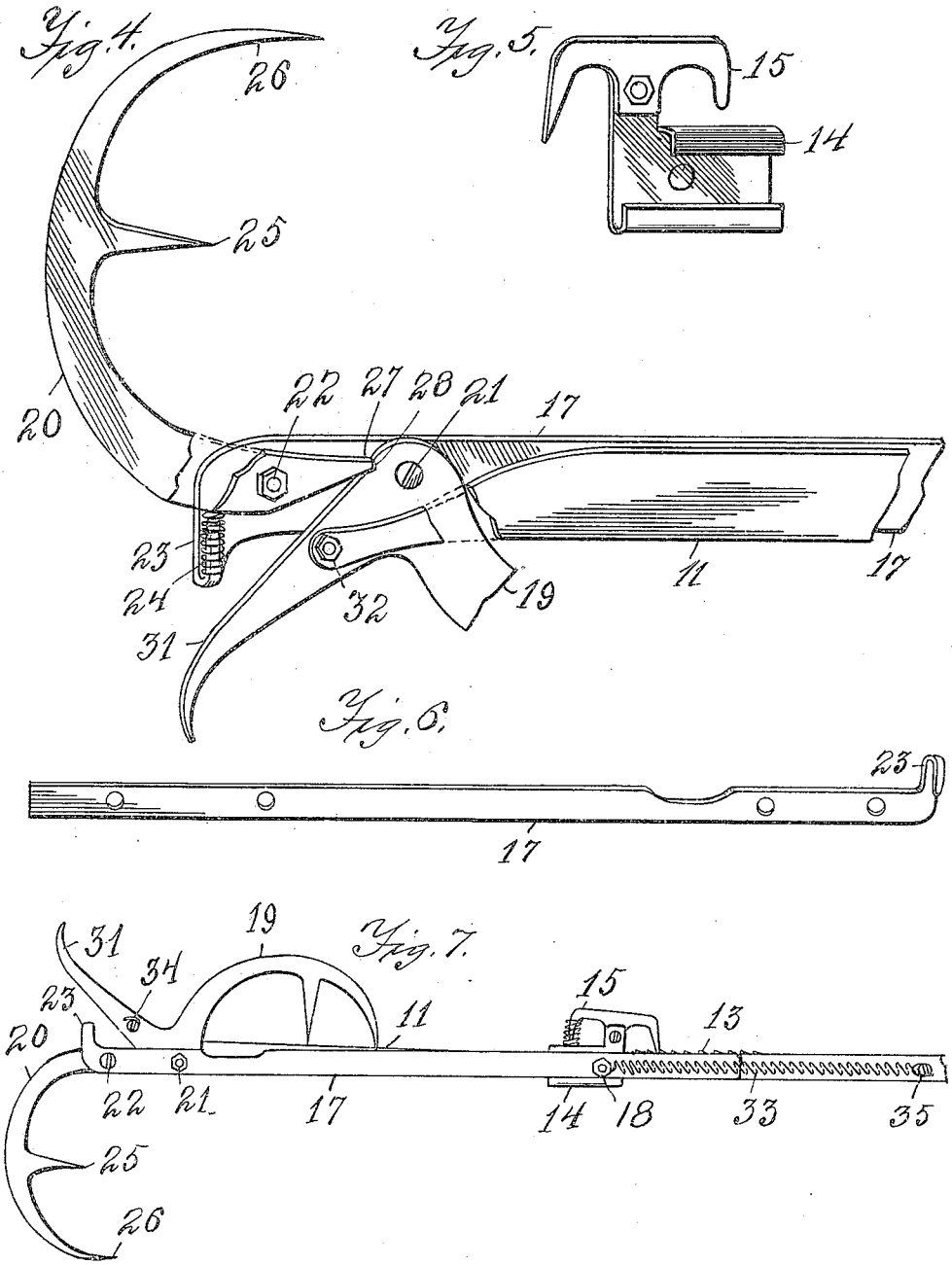

WILLIAM E. BETTIS, OF CORRY, PENNSYLVANIA.

FISHING-GAFF.

949,750.　　　　　　Specification of Letters Patent.　　Patented Feb. 22, 1910.

Application filed April 26, 1909. Serial No. 492,226.

*To all whom it may concern:*

Be it known that I, WILLIAM E. BETTIS, a citizen of the United States, residing at Corry, in the county of Erie, State of Pennsylvania, have invented new and useful Improvements in Fishing-Gaffs, of which the following, taken in connection with the accompanying drawings, is a full, clear, and exact description.

The invention relates to gaff-hooks for landing hooked fish sometimes called a fish-grapple; and the object of my invention is to provide a fishing gaff of simple and strong construction which may be adjusted either to automatic action or to an automatic set with mechanical action or to both mechanical set and action. The mechanism of the gaff hook being thoroughly under the contral of the user so that its action may be practically instantaneous. The setting of the gaff hook is easily attained and after grappling a fish the set of the jaws is firmly locked so as to firmly hold the fish; and the invention consists in the construction and arrangement of the parts as described in this specification and pointed out in the claims and shown in the accompanying drawings.

In the drawings, Figure 1 is a side elevation of the gaff hook in the sprung or grappling position, as when holding a fish between the jaws. Fig. 2 is a similar view of the gaff hook with the jaws in the set position ready for use. Fig. 3 is a rear edgewise view of the gaff hook in the set position as shown in Fig. 2. Fig. 4 is a perspective view of the jaw mechanism, portions of the same being broken away to show the construction of the parts. Fig. 5 is a detail perspective view of the sliding catch or spring lock for the jaws. Fig. 6 is a perspective view of the side bar which is placed alongside the main shaft or bar of the gaff, to which side bar the jaws are pivotally attached. Fig. 7 is a side elevation of the gaff hook in the set position arranged for automatically setting and mechanically operating the gaff.

Similar numerals refer to corresponding parts in the several views.

The numeral 10 indicates the handle of the gaff hook which is preferably attached to the main shaft 11 by screwing on to the same so that the two may be disconnected for packing in small compass within a case. Handle 10 preferably has a spring weighing scale 12 in its body or outer end. It will be appreciated that the jaws of the gaff hook will form a convenient grapple for holding the fish while being weighed and that the handle of the gaff hook is in no wise weakened or injured by the weighing scale.

Shaft 11 has the teeth 13 cut along one edge of the same to receive the sliding clasp 14 which embraces shaft 11 but slides easily along the same. Clasp 14 pivotally supports a peculiarly shaped pawl 15 which engages teeth 13 with one end, the opposite end being turned downward toward clasp 14 and a coil spring 16 placed therebetween so that downward pressure upon the pawl 15 over said spring will instantly and easily disengage the pawl from the teeth 13 so that clasp 14 may be quickly slid along bar 11 in setting the jaws, but spring 16 will instantly cause pawl 15 to engage teeth 13 when the jaws are sprung and will lock and hold the jaws in the spring or grappling position, as shown in Fig. 1.

A second bar 17, which has already been termed a side bar, is pivotally attached to the side of clasp 14 by a suitable screw bolt 18. Bar 17 extends down past the end of main shaft 11 and has pivotally attached thereto the two jaws 19 and 20 by suitable screw bolts at 21 and 22. Jaw 20 extends out from the end of the bar 17 as though it were a continuation of said bar, though pivotally attached thereto, and the lower end 23 of bar 17 is turned to one side in a return bend or side projection so as to receive thereon the coil spring 24 which presses against the rear edge of the pivotally attached jaw 20. The turned end 23 acting also as a positive stop for said jaw 20 so as not to allow it to turn pivotally and thereby allow a fish to escape from the jaw 20. It will be appreciated that the jaw 20 must stand firm in grappling a fish and that too great a resilient holding of said jaw would defeat the purpose of the gaff hook. The turned end 23, however, positively holds against the rear side of the jaw only allowing the spring 24 sufficient action to push upon the rear side of the jaw in setting the same. Jaw 20 may be made a fixed jaw by pressing it back against the turned end 23 and tightening the nut on bolt 22 so that jaw 20 can not move. The jaw 20 is preferably formed with two points 25 and 26 though it would not depart from my invention to have a single pointed jaw. The inner end 27 of jaw 20 is drawn down nearly to a point so as to catch upon an angular projection 28 on the jaw 19.

Jaw 19 is pivotally attached at 21 in such relation to jaw 20 that the two jaws may be set upon one another as described. The jaw 19 has preferably two points 29 and 30 corresponding to the two points 25 and 26 on jaw 20, though this jaw also might be made with the single prong or point. Jaw 19 extends out to the rear in the lever shaped handle 31 and the lower end of main shaft 11 is pivotally attached to said jaw 19 part way up handle 31 at point 32 by means of a suitable bolt. The lower end of shaft 11 being bent to one side sufficiently to give a draw upon jaw 19. Jaw 19 operates between the two bars 11 and 17 as shown in Fig. 3 so that the said jaw is guided firmly to place and at the same time the outer sides of said bars are unobstructed for the attachment of the controlling spring 33, and also to cover the points 29 and 30 between the two bars when in the set position, thereby leaving a smooth surface so that points 29 and 30 can not catch upon the fish when in the set position.

It is apparent that the gaff constructed as thus far described may be set mechanically by sliding spring catch 15 and clasp 14 along shaft 11 until point 27 of jaw 20 engages catch 28 of jaw 19, thereby drawing jaw 19 up into the set position shown in Fig. 2. It would thus be a purely mechanically acting gaff. In order to give an automatic action to the gaff, a spring 33 is pivotally attached at one end to bolt 18 and the opposite end is arranged to engage a hook 34 attached to screw 32 and thereby the spring 33 will exert its force upon the lever 31 of jaw 19 so that when force is applied as in gaffing and pulling upon fish with jaw 20, the two jaws will be released by the slight movement allowed by spring 24, thereby allowing the point 27 to disengage from the projection 28 and allowing the jaw 19 to be automatically sprung upon the fish by means of the spring 33.

Spring 33 may be pivotally turned on bolt 18 and a second hook 35 is provided a suitable distance from bolt 18 upon the main shaft 11 toward handle 10, so that by disengaging spring 33 from hook 34 and turning said spring so that it engages hook 35 it is apparent that the force of the spring will be exerted upon the side bar 17 and clasp 14, thereby automatically setting jaw 19 but said jaw will be operated mechanically, the draw of jaw 20 upon the fish disengaging the catch 27 and 28 and drawing down upon side bar 17 and thereby drawing jaw 19 into the grappling position, as shown in Fig. 7. It is therefore apparent that the gaff may be used purely as a mechanically acting gaff or may be automatically set or may be a substantial automatic gaff in that jaw 19 will be automatically sprung by pressure upon jaw 20. It is also obvious that all that is necessary to release the fish is to press down upon spring pawl 15, thereby unlocking said pawl and allowing the clasp 14 to slide along main shaft 11 toward handle 10, thereby drawing jaw 19 away from the fish and into the said position.

I claim as new:

1. A fishing gaff comprising a handle, a shank attached to said handle, a side bar slidably mounted on said shank, gaffing jaws pivotally mounted on said side bar, a catch on the inner jaw engaged by the outer jaw, a spring for said outer jaw to hold it against said catch, and the lower end of said shank attached to the inner jaw, substantially as and for the purpose specified.

2. A fishing gaff comprising a handle, a shank attached to said handle, ratchet teeth on said shank, a side bar slidably mounted on said shank, a locking pawl on said side bar to engage said ratchet teeth, a gaffing jaw pivotally attached to the lower end of said shank and also to said side bar to give a draw on said jaw, a second gaffing jaw pivotally attached to said side bar and engaging a projection on said first jaw when in the set position, and a spring on said side bar to resiliently hold the second jaw, substantially as and for the purpose specified.

3. A fishing gaff comprising a handle, a shank attached to said handle, ratchet teeth on said shank, a side bar slidably mounted on said shank, a locking pawl on said side bar to engage said ratchet teeth, a gaffing jaw pivotally attached to the lower end of said shank and also to said side bar to give a draw on said jaw, a second gaffing jaw pivotally attached to said side bar and engaging a projection on said first jaw when in the set position, a spring and stop on said side bar to resiliently hold said second jaw, and a spring pivotally attached to said side bar and to said first jaw to automatically actuate said first jaw when released, substantially as and for the purpose specified.

4. A fishing gaff comprising a handle, a shank adjustably attached to said handle, ratchet teeth on said shank, a side bar slidably mounted on said shank, a locking pawl on said side bar to engage said ratchet teeth, a gaffing jaw pivotally attached to the lower end of said shank and also to said side bar to give a draw on said jaw, a second gaffing jaw pivotally attached to said bar and engaging a projection on said first jaw when in the set position, a spring pivotally attached to said side bar, a hook on said first jaw, a second hook on said shank toward said handle, said spring arranged to interchangeably engage either of said hooks, substantially as and for the purpose specified.

5. A fishing gaff comprising a handle, a shank attached to said handle, ratchet teeth on said shank, a clasp slidably mounted on said shank, a spring locking pawl pivotally mounted on said clasp to engage said ratchet teeth, a bar pivotally attached to said clasp and extending beyond the end of said shank, a gaffing hook or jaw pivotally attached to said bar, a lever shaped extension on said jaw, the lower end of said shank pivotally attached to said lever, a second gaffing jaw or hook pivotally attached to said bar, a spring on said bar to resiliently hold said second hook or jaw, a projection on said first hook or jaw to receive the end of said second hook or jaw to hold said first hook or jaw in the set position, substantially as and for the purpose specified.

In testimony whereof I have signed my name to this specification in the presence of two subscribing witnesses.

WILLIAM E. BETTIS.

Witnesses:
I. A. ELLSWORTH,
A. W. KETTLE.